L. C. SHARP.
CAN BODY FORMING AND SOLDERING MACHINE.
APPLICATION FILED AUG. 28, 1908. RENEWED JULY 28, 1915.

1,153,454.

Patented Sept. 14, 1915.
13 SHEETS—SHEET 1.

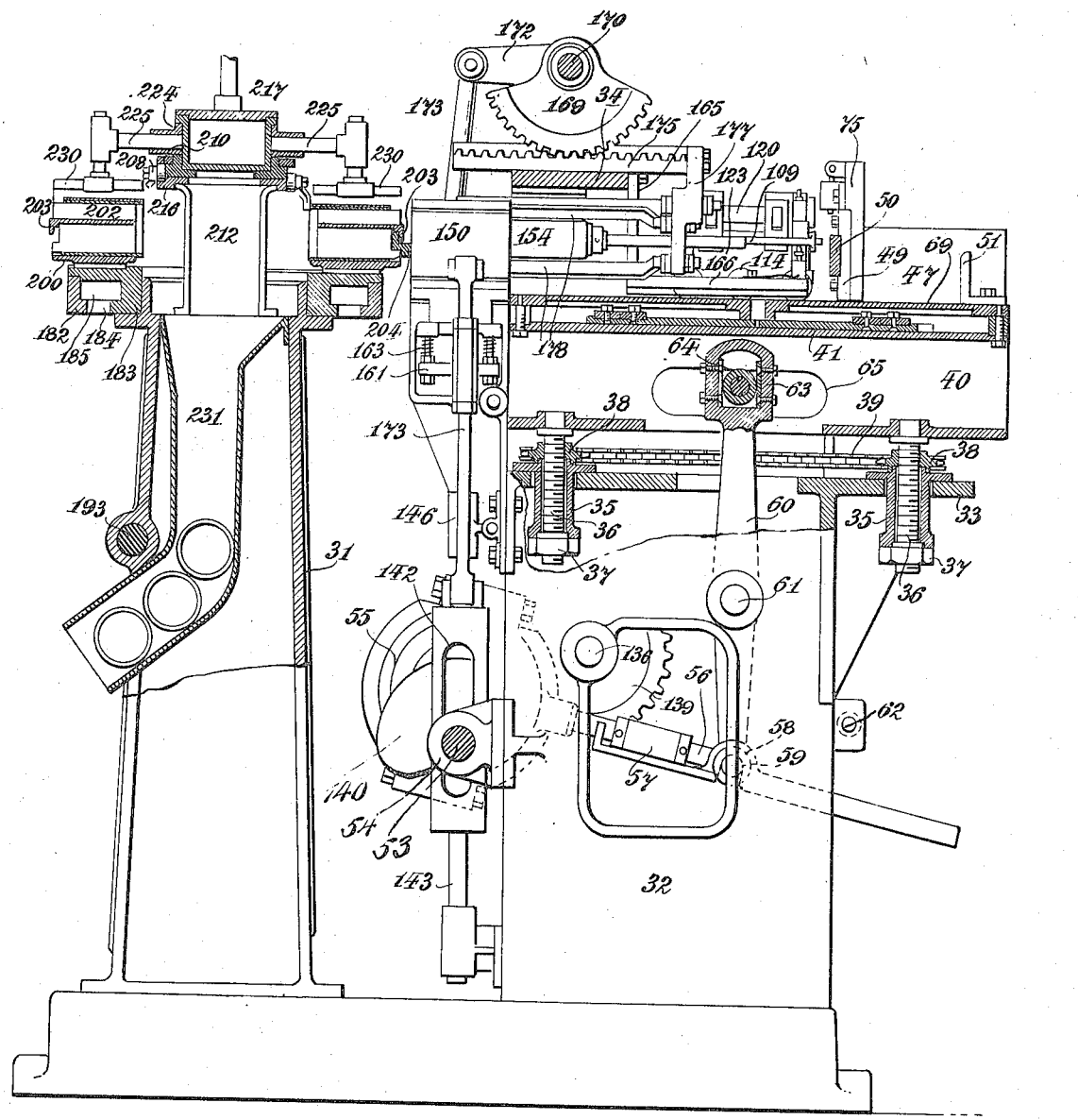

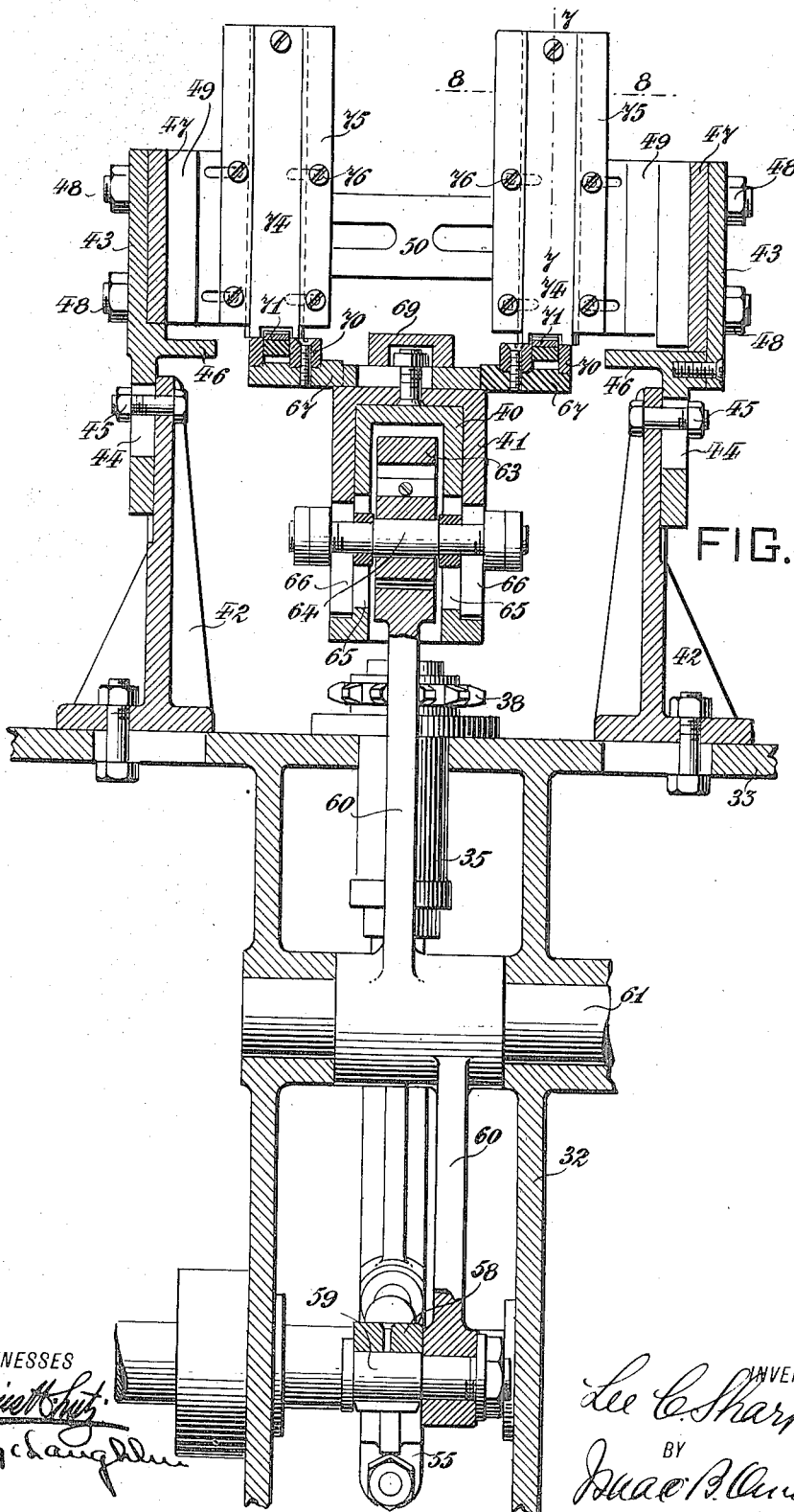

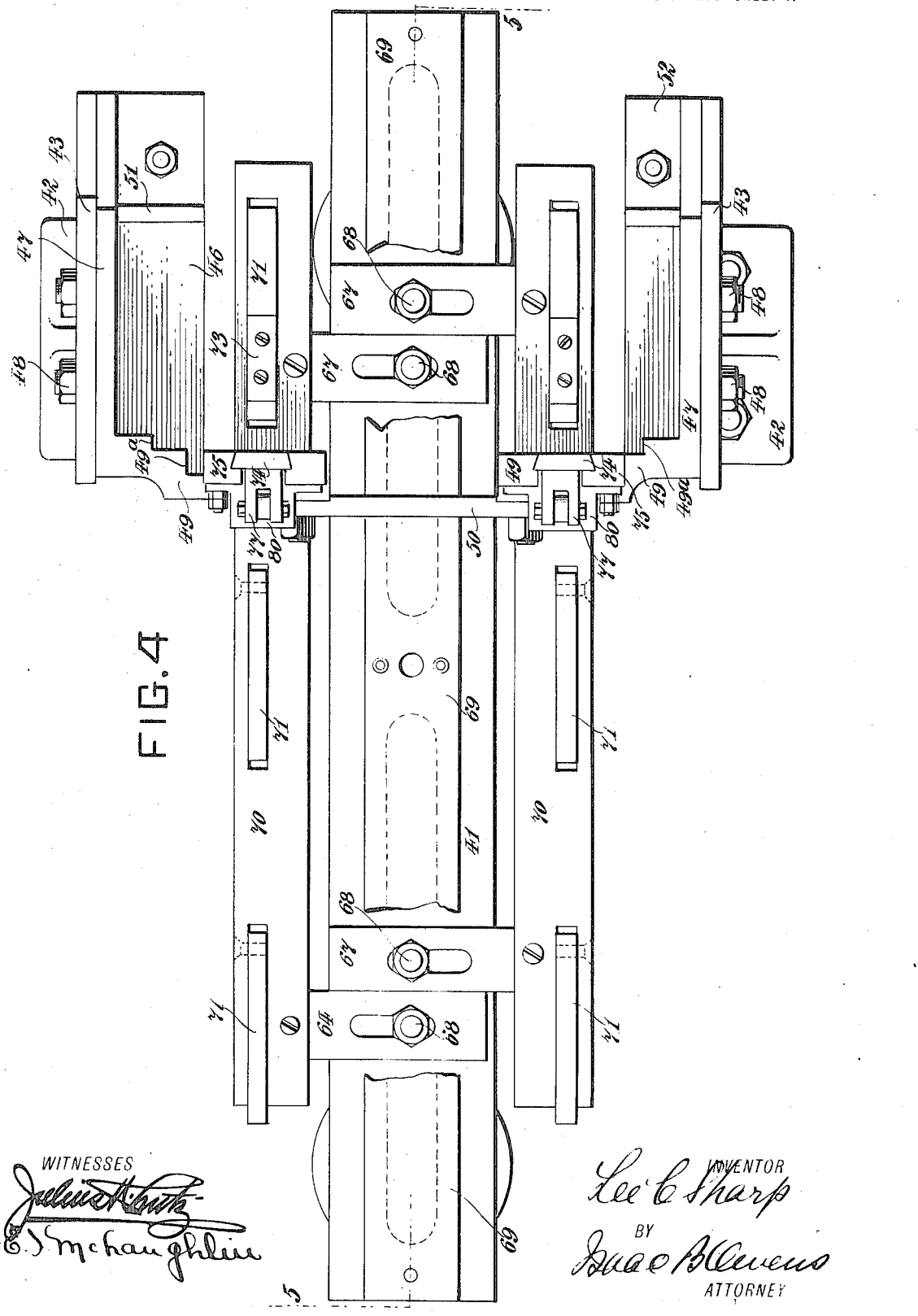

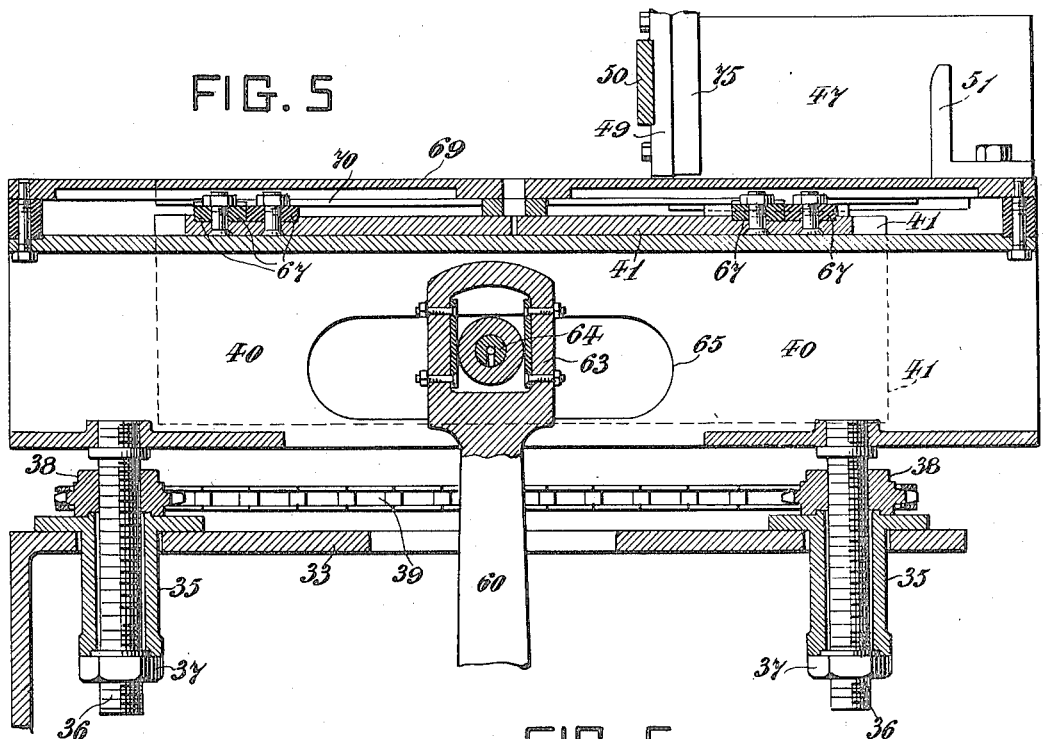

L. C. SHARP.
CAN BODY FORMING AND SOLDERING MACHINE.
APPLICATION FILED AUG. 28, 1908. RENEWED JULY 28, 1915.

1,153,454.

Patented Sept. 14, 1915.
13 SHEETS—SHEET 6.

WITNESSES

INVENTOR
Lee C Sharp
BY
ATTORNEY

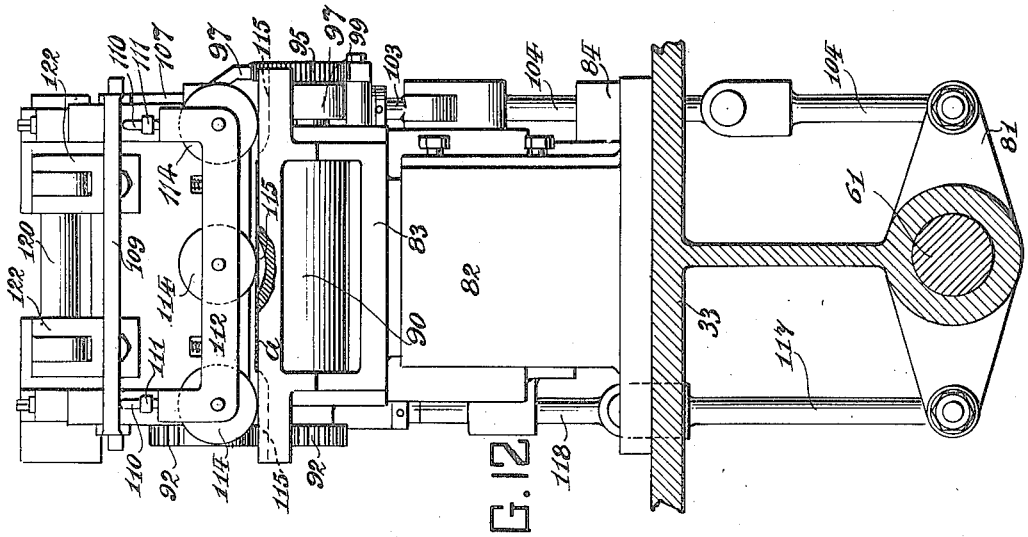

L. C. SHARP.
CAN BODY FORMING AND SOLDERING MACHINE.
APPLICATION FILED AUG. 28, 1908. RENEWED JULY 28, 1915.
1,153,454.
Patented Sept. 14, 1915.
13 SHEETS—SHEET 8.
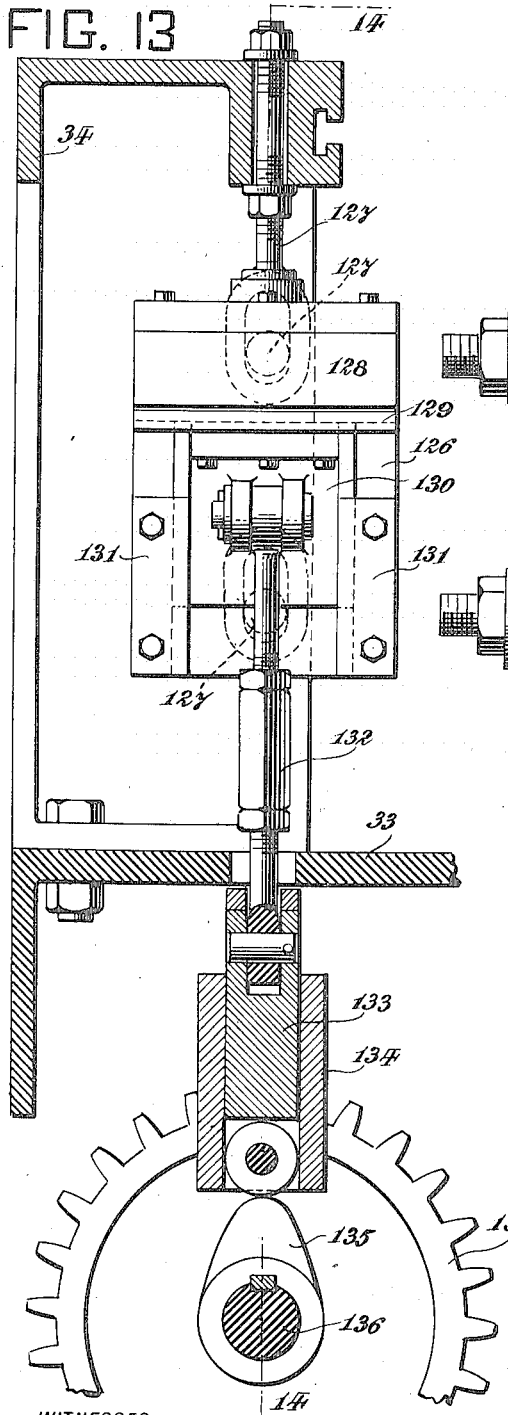
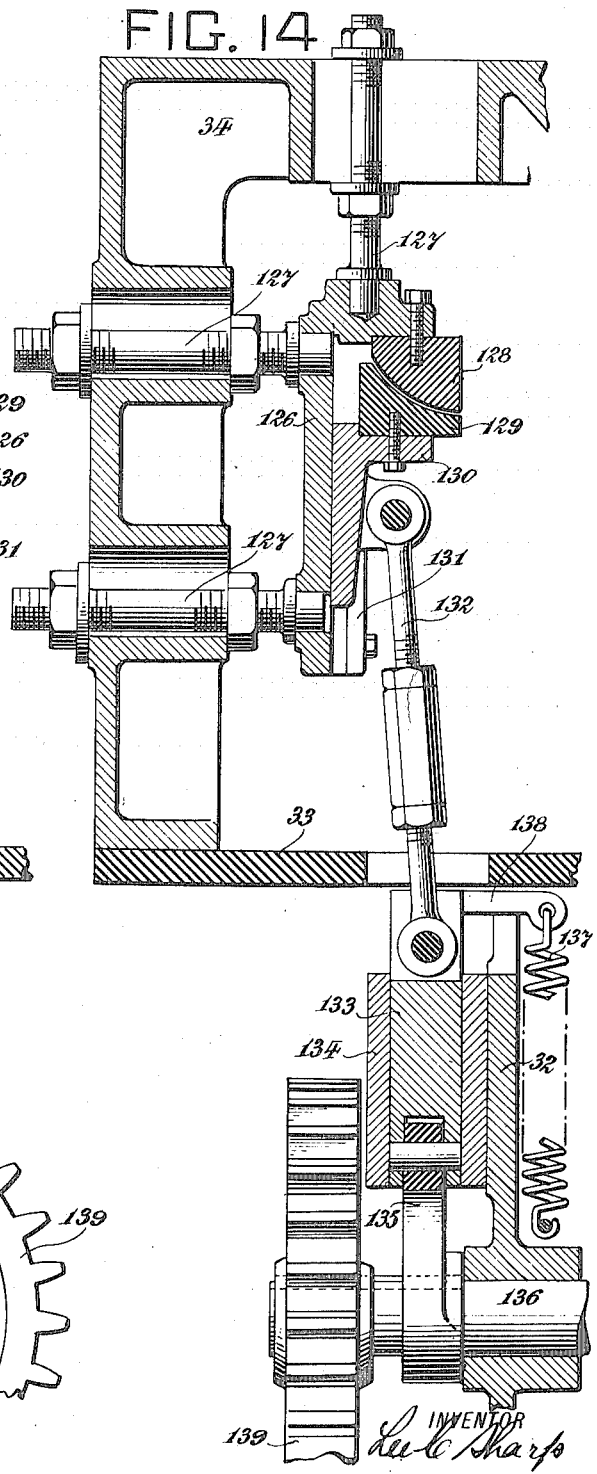

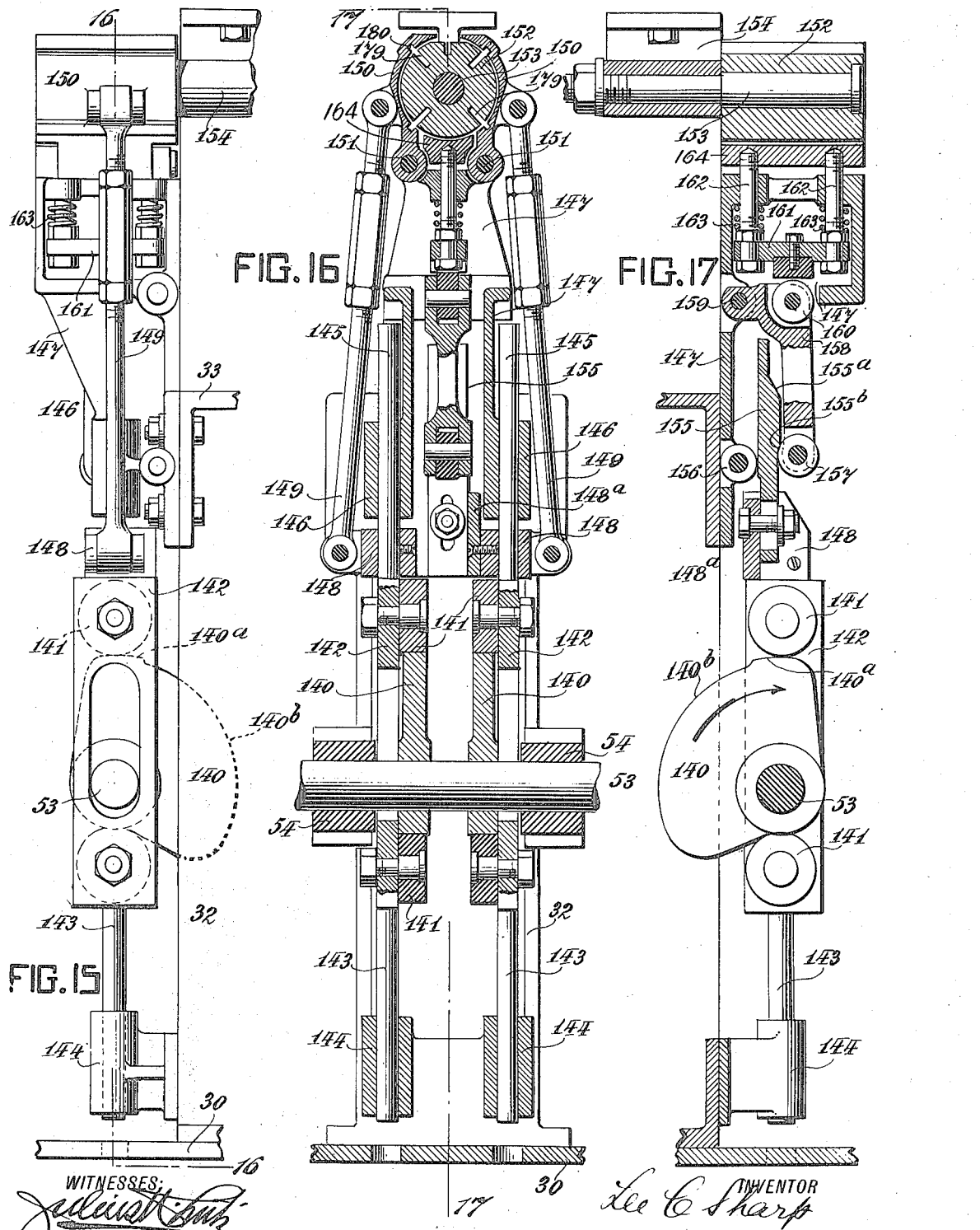

L. C. SHARP.
CAN BODY FORMING AND SOLDERING MACHINE.
APPLICATION FILED AUG. 28, 1908. RENEWED JULY 28, 1915.

1,153,454.

Patented Sept. 14, 1915.
13 SHEETS—SHEET 10.

WITNESSES

INVENTOR
Lee C. Sharp
BY
Isaac B. Owens
ATTORNEY

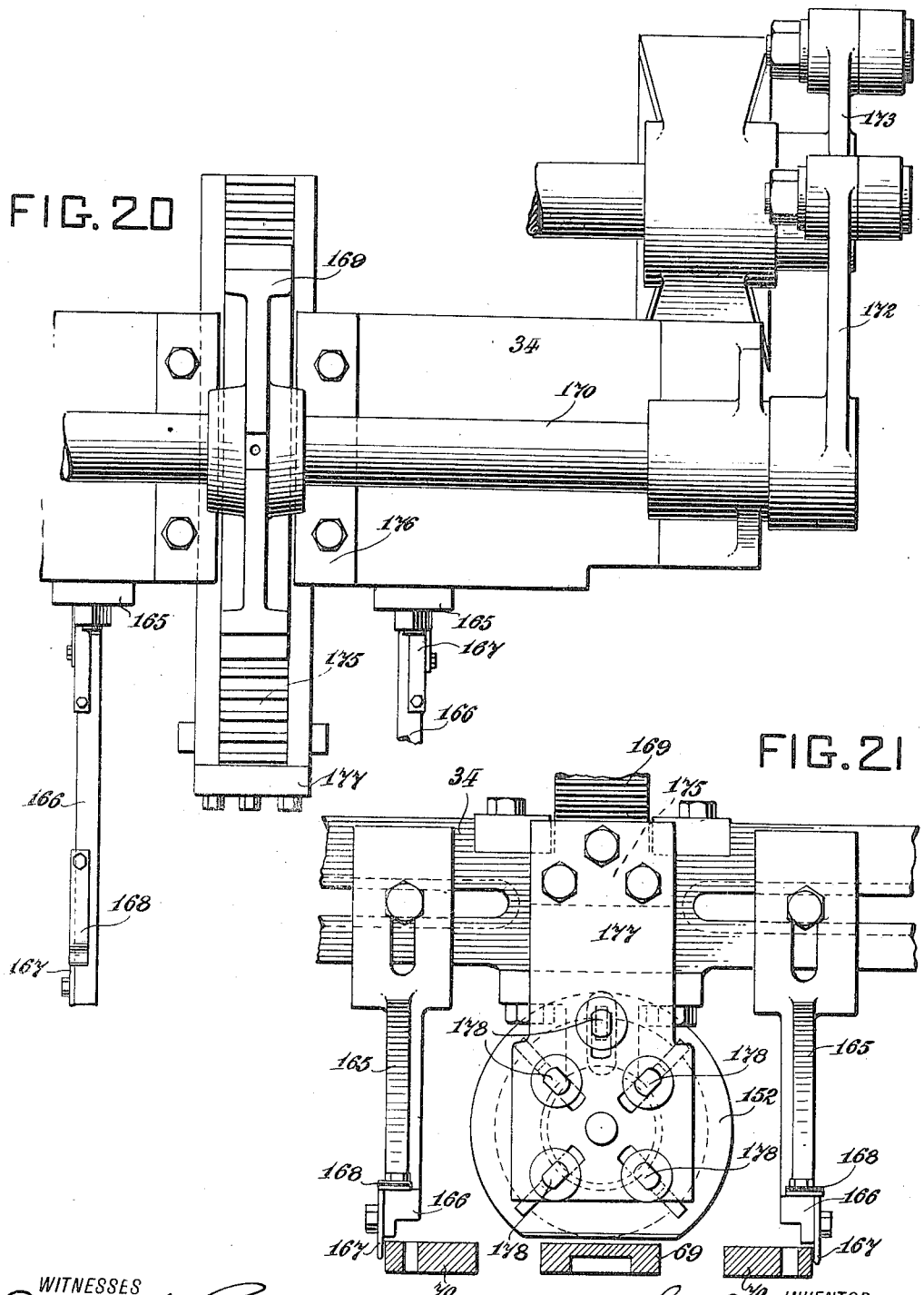

L. C. SHARP.
CAN BODY FORMING AND SOLDERING MACHINE.
APPLICATION FILED AUG. 28, 1908. RENEWED JULY 28, 1915.
1,153,454.
Patented Sept. 14, 1915.
13 SHEETS—SHEET 12.
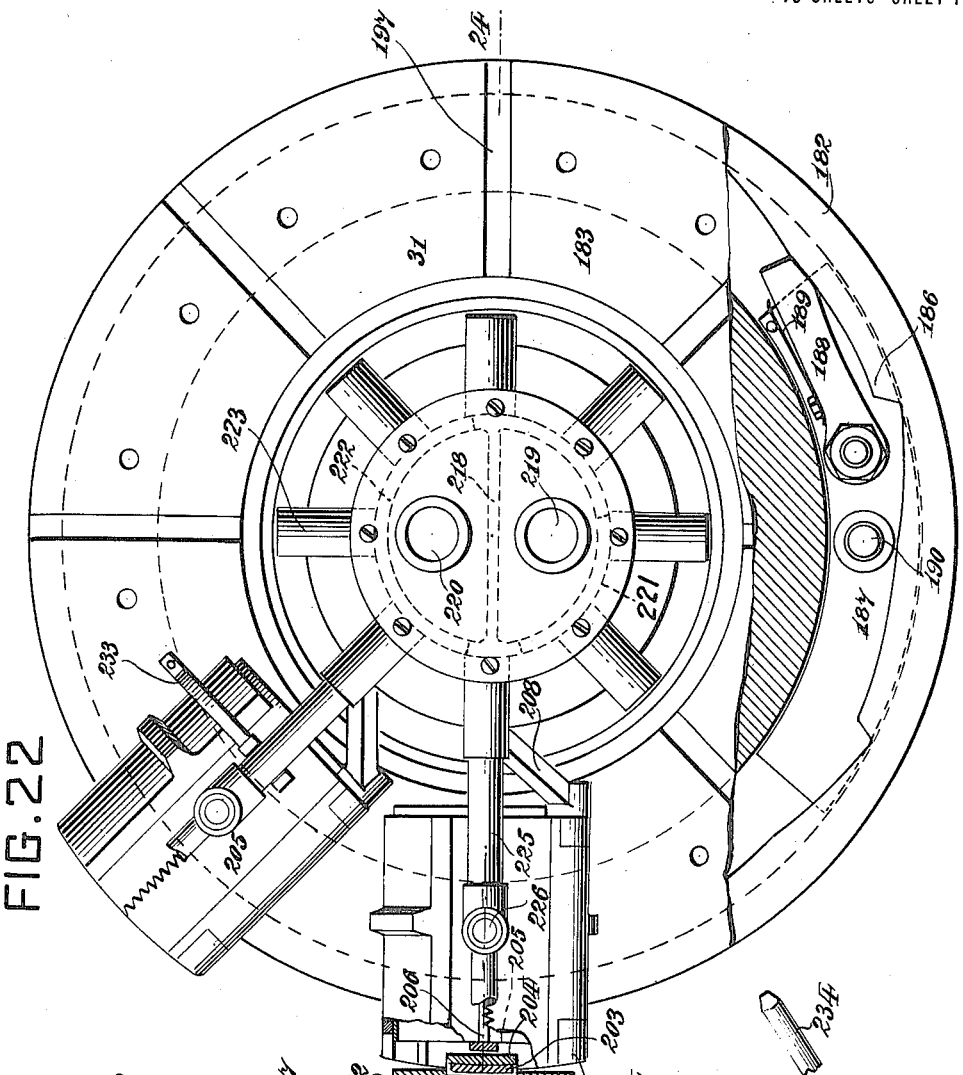
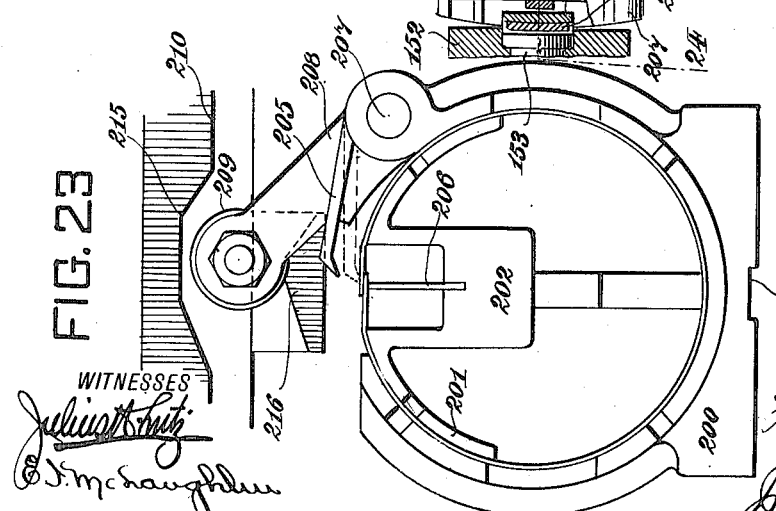
WITNESSES
INVENTOR
Lee C. Sharp
BY
Isaac B. Owens
ATTORNEY

UNITED STATES PATENT OFFICE.

LEE C. SHARP, OF PLATTSMOUTH, NEBRASKA, ASSIGNOR TO BREMER & BRUCKMAN, OF BRUNSWICK, GERMANY.

CAN-BODY FORMING AND SOLDERING MACHINE.

1,153,454.  Specification of Letters Patent.  Patented Sept. 14, 1915.

Application filed August 28, 1908, Serial No. 450,609. Renewed July 28, 1915. Serial No. 42,452.

*To all whom it may concern:*

Be it known that I, LEE C. SHARP, of Plattsmouth, county of Cass, State of Nebraska, have invented certain new and useful Improvements in Can-Body Forming and Soldering Machines, of which the following is a full, clear, and exact specification, such as will enable others skilled in the art to which it appertains to make and use the same.

My invention relates to a machine for automatically bending blank tin plates into the form of a can body with its meeting edges lapped to produce a lapped seam and for soldering this seam.

The invention resides in certain novel features of construction and combinations of parts all of which will be fully set forth hereinafter and particularly pointed out in the claims.

Figure 1:
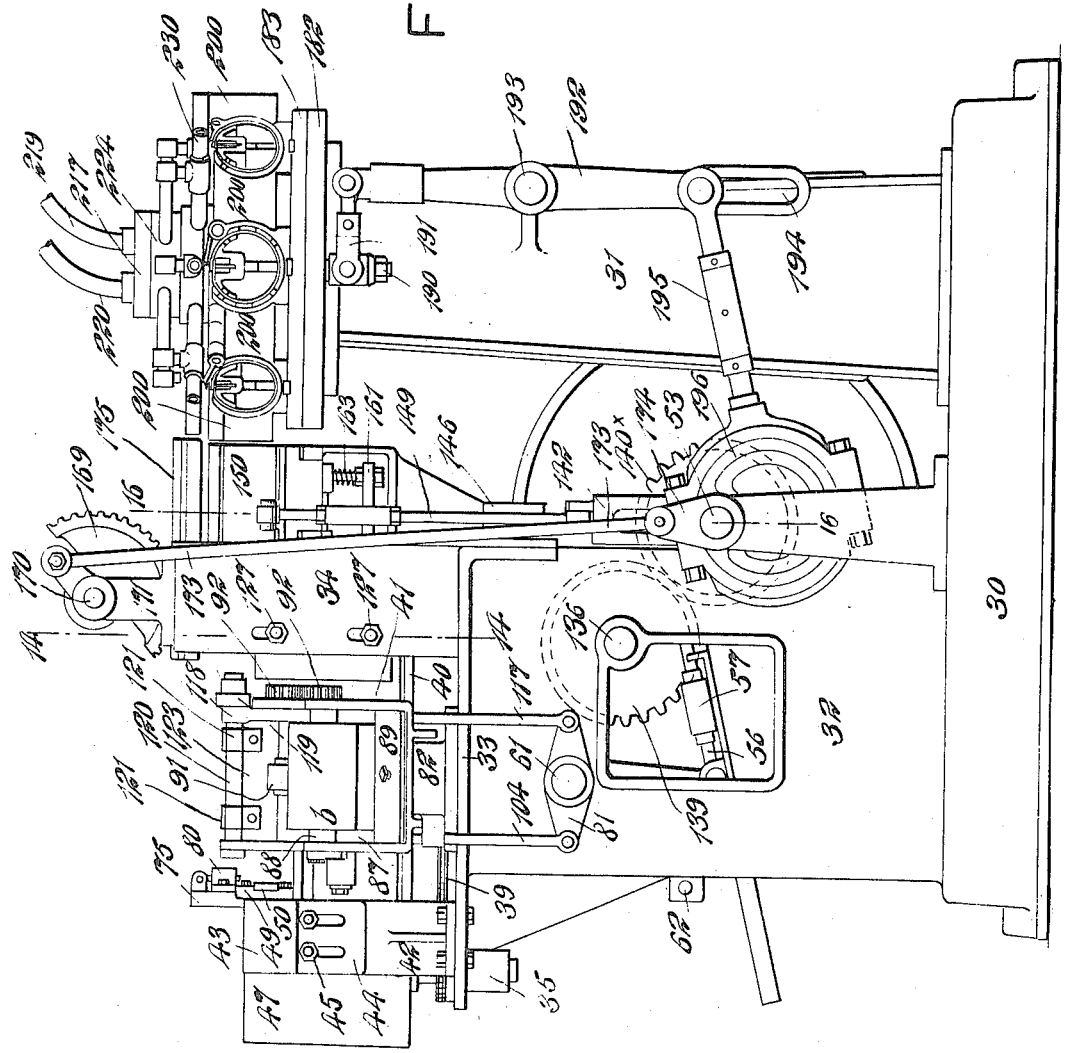
Figure 9:
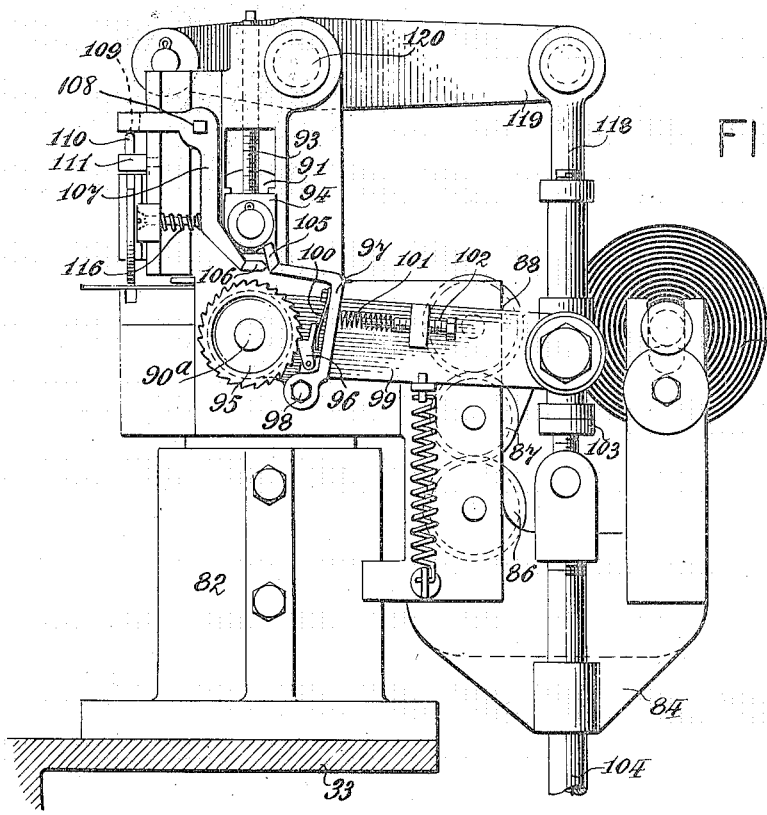
Figure 10:
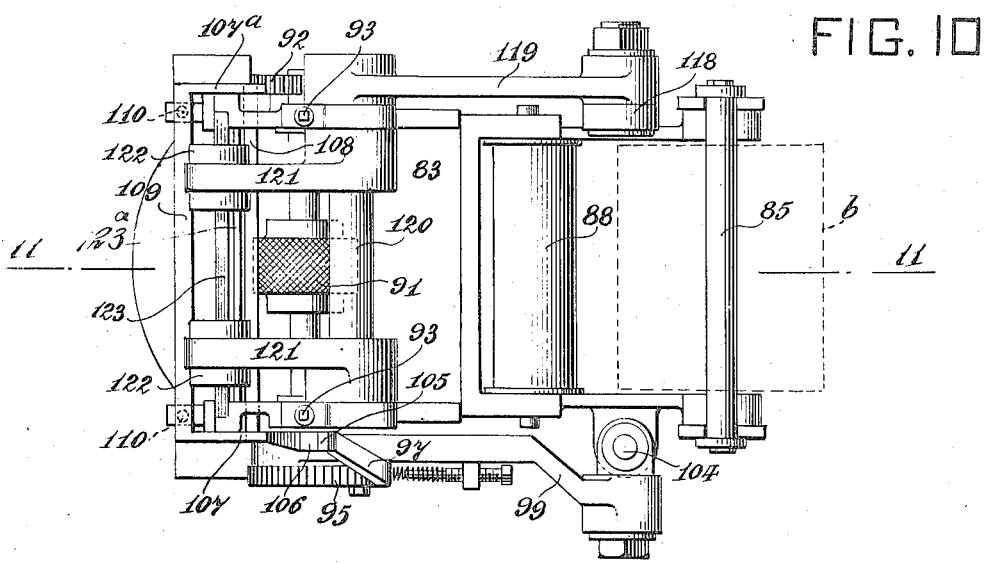
Figure 18:
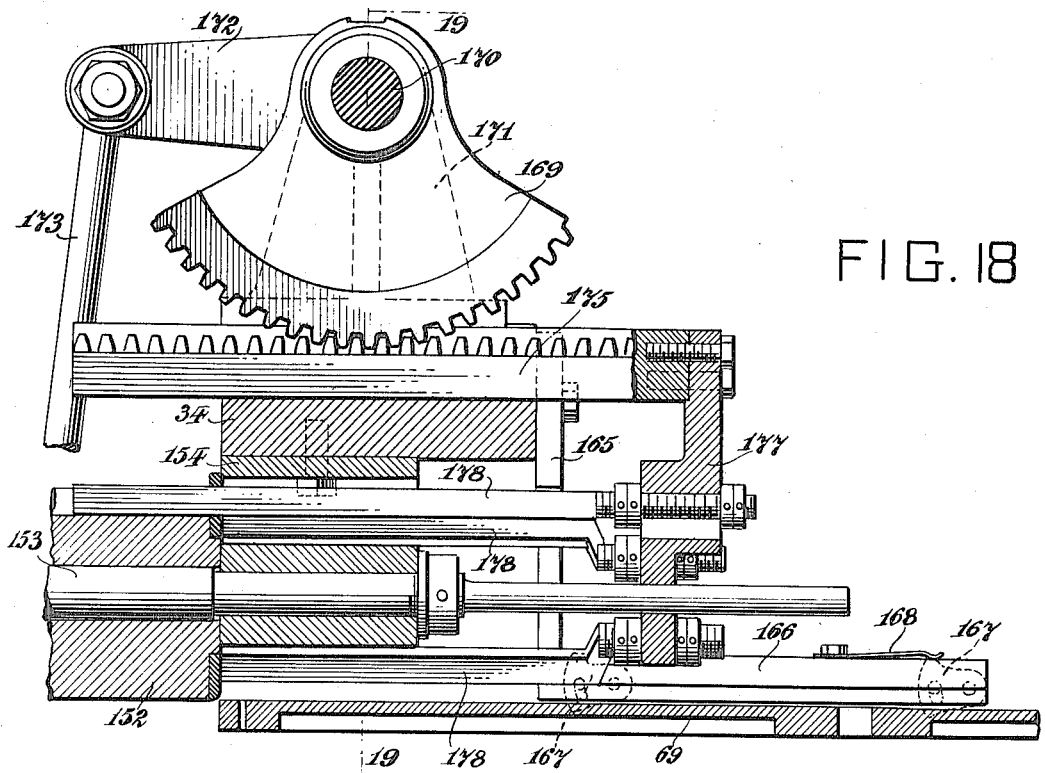
Figure 19:
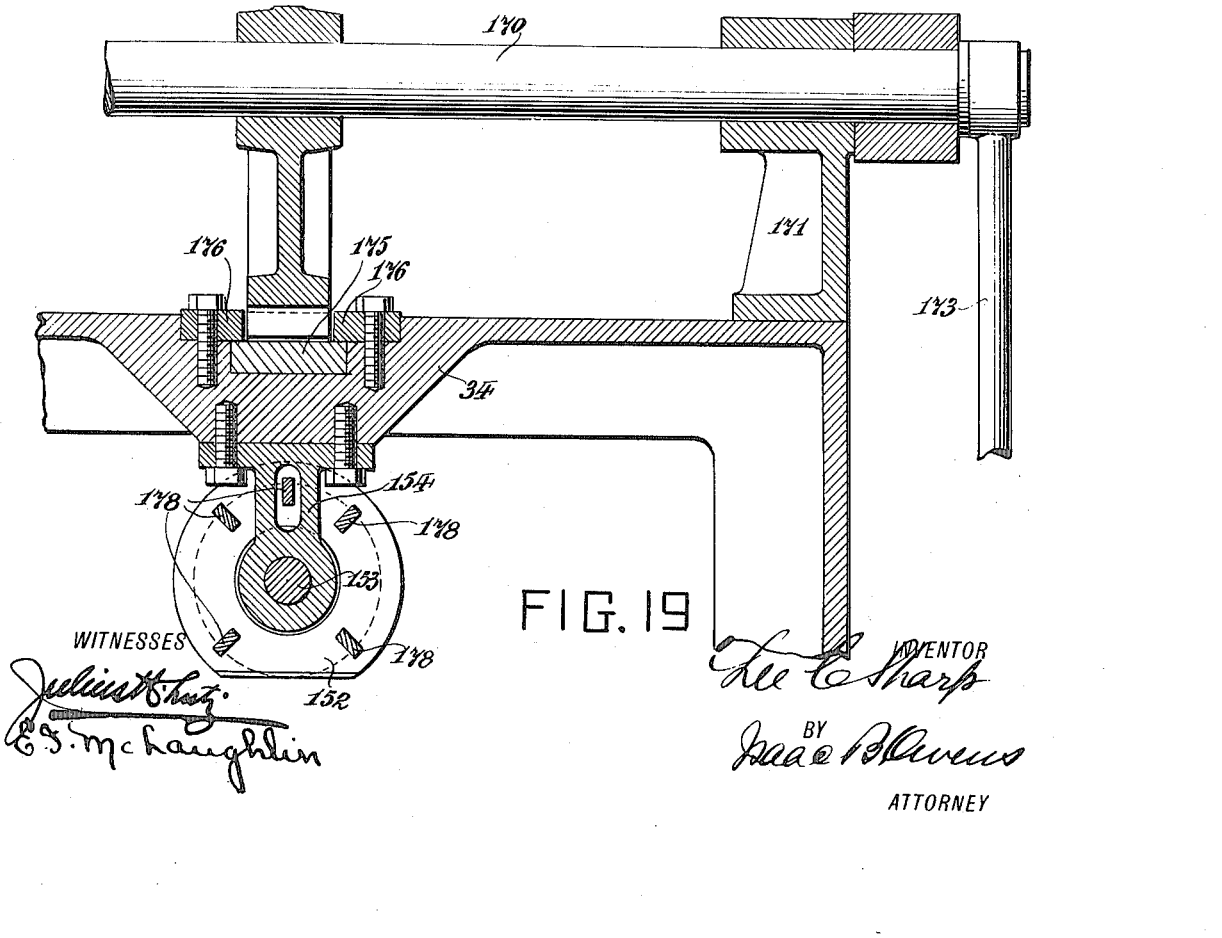
Figure 24:
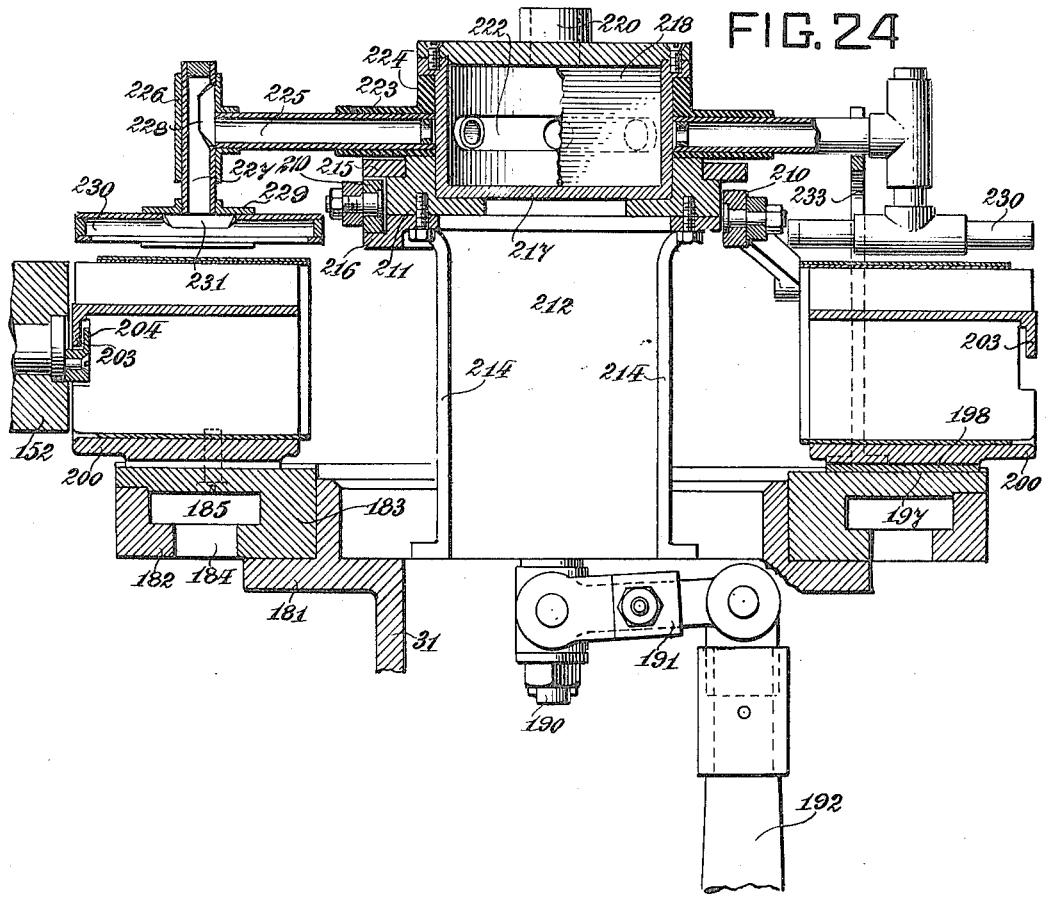

Reference is had to the accompanying drawings which illustrate as an example, one manner in which the invention may be practically embodied, in which drawings, Figure 1 is a right hand side elevation of the machine; Fig. 2 is an elevational view looking toward the left hand side of the machine with the upper part thereof in vertical longitudinal section; Fig. 3 is a transverse vertical section taken through the magazine containing the blank metal plates and showing the manner of mounting the magazine on the frame and the devices for feeding the plate forward; Fig. 4 is a plan view of the magazine and of the devices for advancing the tin plate from the same through the successive operations thereon up to the folding of the plate to form the can body; Fig. 5 is a central longitudinal vertical section of the parts shown in Fig. 4 taken on the line 5—5 of such figure; Fig. 6 is a longitudinal sectional view of one of the two sets of dogs and the sliding bar which carries them. Fig. 7 is an enlarged detail section on the line 7—7 of Fig. 3 illustrating one of the spring pressed fingers which hold the blank tin at the rear or discharge side of the magazine; Fig. 8 is a sectional plan on the line 8—8 of Fig. 3; Fig. 9 is a side elevation of the devices for feeding and supplying the solder in the form of a foil with an adhesive flux; Fig. 10 is a plan view of the same; Fig. 11 is a vertical transverse section on the line 11—11 of Fig. 10; Fig. 12 is a front elevation of the solder applying devices with a fragment of the frame in longitudinal section; Fig. 13 is an elevational view of one of the devices for crimping the edges of the blank preparatory to bending the same, this view showing part of the frame of the machine in longitudinal section; Fig. 14 is a transverse section of the same parts on the line 14—14 of Figs. 1 and 13; Fig. 15 is a side elevation of the devices for bending or folding the blank tin around a horn to form the can body; Fig. 16 is a transverse section of such devices on the line 16—16 of Figs. 1 and 15; Fig. 17 is a longitudinal section of the blank bending devices on the line 17—17 of Fig. 16; Fig. 18 is a longitudinal sectional elevation of the devices for advancing the can body from the bending devices shown in Figs. 15, 16 and 17 to the turret on which latter the solder is melted to complete the seaming operation. Fig. 19 is a section on the line 19—19 of Fig. 18; Fig. 20 is a plan view of the parts shown in Figs. 18 and 19; Fig. 21 is a front end elevation of said parts; Fig. 22 is a plan view of the turret with parts broken away to show the means for imparting a step by step rotary motion to the turret; Fig. 23 is an enlarged detail showing the devices for pinching the lapped edges of the can blank together preparatory to melting the solder and during the cooling thereof, together with the cam for actuating said devices; and Fig. 24 is a vertical section through the turret on the line 24—24 of Fig. 22.

The framing of the machine comprises a base 30 on which is adjustably mounted a column 31 sustaining the turret to be hereinafter described. The box casting 32 has a table 33 at its upper end and at the rear edge of this table is erected an inverted U-shaped bridge 34. In this table 33 are arranged two sleeves 35 (see Figs. 2 and 5) vertically disposed and adapted to accommodate threaded pins 36 having jam nuts 37 at their lower ends. On the upper ends of the sleeves 35 sprocket wheels 38 are arranged, these sprocket wheels being interiorly threaded to act as nuts on the pins 36 and connected to turn in unison by a chain 39. The pins 36 have their upper ends non-rotatably engaged in a horizontal longitudinally disposed box-like frame member 40 which is supported by said pins and which forms a track for the inverted U- shaped slide 41 (see Figs. 2 and 3). By turning the sprockets 38 the pins 36 may be adjusted vertically to adjust the position of the box 40 and said pins, therefore, perform the function not only of supporting but adjusting the box or slideway 40. The slide 41 supports the devices for advancing the blank tin and such slide is, in operation, given a regular back and forth movement all of which will be fully described hereinafter.

The magazine which contains the blank tin in the form of flat plates of the requisite size is of open or skeleton-like construction and is supported by two brackets 42 adjustably fastened on the table 33 and rising therefrom. These brackets carry vertical longitudinally disposed side plates or walls 43 adjustably sustained through a slotted lug 44 and bolts 45. The side walls 43 have inwardly projecting ledges 46 which form the bottom of the magazine and against the inner sides of said walls 43 side plates 47 are adjustably fastened by bolts 48 (see Figs. 3 and 4). These side plates 47 have at their front ends inwardly turned portions 49 which form stops to limit the forward motion of the pile of blanks and which are connected by a cross member or bridge 50 bolted to the front sides of said inwardly projecting portions. As shown in Fig. 4, the parts 49 are shouldered at 49ª and this is for the purpose of accommodating various sizes and shapes of blanks. The specific form of these shoulders will not be described in detail since they will necessarily vary according to the sort of blanks to be handled. At the rear the magazine is provided with two stops 51 and 52 which are in the form of angle irons adjustably bolted on top of the flanges or ledges 46 such stops serving to engage the rear side of the pile of blanks to prevent them from moving out the open rear end of the magazine. These elements constitute the stationary parts of the magazine which it will be seen from Figs. 1 and 2 is erected at the extreme front end of the table 33.

53 is the prime mover shaft of the machine and the same is mounted transversely at the rear side of the box 32 in bearings 54 attached thereto. On the shaft 53 is an eccentric 55 which operates a rod 56. This rod is formed in sections with an adjusting means 57 connecting them and said rod has intermediate its ends a loop 58 loosely engaged with a pin 59 on a lever 60. This lever is intermediately fulcrumed at 61 and is given a regular vibratory motion by the action of the parts 55 and 56. The loop 58 of the arm 56 rests by gravity on the pin 59 and should any of the parts of the machine become clogged or the operation be otherwise dearranged the attendant at the front end of the machine may grasp the projecting end of the arm 56 and lift the loop out of engagement with the pin, thus stopping the motion of lever 60 and the connected parts. 62 indicates two oppositely disposed spring pressed pins normally spaced apart a distance less than the thickness of the arm 56, but capable of being forced farther apart so that said arm may be moved between them when disengaged from the lever 60 and by which the arm may be releasably held in raised position as long as desired.

The lever 60 projects upward through an opening in the table 33 into the hollow box or slideway 40 and is formed at its upper end with an eye 63 receiving a pin and friction roller 64 which moves freely through slots 65 in the vertical walls of the slideway 40. This pin 64 has its end portions engaged in vertical slots 66 in the slide 41 so that vibration of the lever 60 will not affect the slideway 40 and will impart a regular back and forth motion to the slide 41. This slide 41 as shown best in Fig. 4 has two pairs of transverse arms 67 adjustably fastened thereto by bolts 68. The bolts are covered by an elongated cap 69 mounted upon the slideway 40. Said arms 67 support at each side of the slide longitudinally disposed racks 70 in each of which three dogs 71 are mounted. These racks 70 and the cap 69 have their upper surfaces in the same plane and level with the upper surfaces of the ledges 46 (see Fig. 3) so that the blank tin may rest uniformly on all of these parts. As shown best in Fig. 6, the dogs 71 are pivoted in cavities in the racks and are pressed by up springs 72. The dogs 71 directly under the magazine are provided with steel plates 73 furnishing knife edges which insure engaging the bottommost plate of the pile of blanks, but prevent the dogs from engaging more than one sheet at a time, the knife edges formed by such plates projecting above the surface of the dogs for a distance equal only to the thickness of one of the blank plates. For further insuring the movement of only one plate at a time out of the magazine two stop bars 74 are provided. These stop bars, as shown best in Figs. 3, 7 and 8, are each mounted in a vertically disposed undercut carrier 75, which carriers are adjustably mounted by screws or other fastenings 76 on the inturned portions 49 of the walls 47 of the magazine. The stop bars are vertically movable in the carriers 75 and have at their upper ends, as shown best in Fig. 7, rearwardly projecting brackets 77 connected by pins 78 with springs 79 held in housings 80 on the upper ends of the carriers, these devices yieldingly pressing the stop bars 74 downward on the racks 70. The lower extremities of said stop bars are rounded slightly sufficiently to allow one sheet or plate of tin to pass under them but to prevent the passage of the sheets above. Upon the motion of the lever 60, therefore, the slide 41 is given a regular back and forth motion which is transmitted by the arms 67 to the racks 70 and the dogs 71 of the racks engage the blanks and give them progressive step by step motion rearward in the machine, the right hand dogs in Fig. 4 moving the plate out of the magazine to the solder applying station, the middle dogs moving the blank from the solder applying station to the edge forming or crimping station and the left hand dogs in Fig. 4 moving the blanks from the edge forming to the blank bending station, such operations taking place intermittently to allow the necessary work to be performed on the blank tin as will hereinafter fully appear.

The solder is applied to one edge of the blank before it is rolled up to form the can body. In applying the solder it is in the form of a foil previously prepared and coated on one side with a sticky or adhesive flux which serves the double purpose of causing the solder to adhere to the tin and of fluxing the solder when it is sufficiently melted by a flame provided for that purpose in a manner to be hereinafter described. The solder applying device is mounted at the right hand side of the frame on the table 33 and is driven by a rocker arm 81 mounted fast on the projecting end of the shaft 61 (see Figs. 1 and 9 to 12). The table 33 carries a vertical bracket 82 which in turn sustains a box 83, the upper surface of which is level with the plane in which the blank tin travels so that the right hand edge of the blank may move over it as shown in Figs. 9, 11 and 12 where $a$ indicates the blank. The bracket 82 also carries an arm 84 on which is mounted a shaft 85 carrying a roll of solder foil indicated at $b$. On said arm 84 is a pan 85$^a$ carrying the adhesive flux and into this a roll 86 is dipped. Above the roll 86 are two other rolls 87 and 88 and the solder foil passes down between the rolls 86 and 87 and up over the roll 88, thence along the upper surface of the box 83.

89 indicates a scraper which works on the surface of the roll 86 to remove the superfluous flux. The solder in passing over the roll 86 has the flux applied to one surface thereof and this surface is that on the under side next to the blank so that when the solder is cut into the narrow strip and pressed into the blank it adheres thereto. From the rollers 86, 87 and 88 the solder passes over a roller 90 arranged in the box 83 and above which is a milled wheel 91. The shafts of the roller 90 and wheel 91 carry meshing spur gears 92 so that the parts 90 and 91 turn in unison and necessary pressure is exerted on the top of the foil by the wheel 91 through the action of adjusting screws 93 engaging the boxes 94 in which the shaft of the wheel 91 is mounted. Outside of the box at the front end of the shaft 90$^a$ of the roll 90 is arranged a ratchet wheel 95 which is fastened to said shaft and adapted to be acted on by a pawl 96. This pawl is pivoted on an arm 97 which in turn is mounted by a pivot 98 to an arm 99 mounted to swing around the center of the shaft 90$^a$. The pawl 96 is pressed toward the ratchet wheel 95 by a spring 100 carried on the arm 97 and said arm 97 itself is pressed toward the ratchet by a spring 101 connected by an adjustment screw 102 with the said arm 99. On the upward motion of the arm 99 the pawl 96 normally imparts a rotative motion to the ratchet 95 and the rolls 90 and 91 and on the downward motion of the arm 99 the pawl slips over the ratchet wheel to recover its engagement therewith. The arm 99 is connected by a link 103 with a vertically reciprocal rod 104 guided in a bracket 84 and connected to one end of the rocker arm 81 before described, by which the rod 104 is given a regular reciprocal motion.

The arm 97 is elbow-shaped and its free end terminates in a toe 105. This toe is adapted to coact with a toe 106 on an elbow lever 107 which is fulcrumed on the framing of the solder applying device by the rock shaft 108 (see Fig. 9). At the opposite side of the soldering device (see Fig. 10) is an arm 107$^a$ similar to the arm 107 except that the lower limb thereof is omitted. This arm 107$^a$ is mounted on the shaft 108 and the two arms 107 and 107$^a$ are connected at their free ends by a cross bar 109. This cross bar engages two pins 110 (see Fig. 12) which are vertically movable and guided on the framing of the solder applying device by boxes 111. The pins 110 are joined to a U-shaped carrier or mount 112 which sustains a number, preferably three, wheels 114. These wheels 114 operate over corresponding cavities 115 in the top of the box 83 and are adapted to have the plate (indicated at $a$) run under them, lifting the mount 112 and rocking the lever 107.

116 indicates a spring (see Fig. 9) which presses against the arm 107 tending to move downward the wheels 114 and mount 112, this spring being compressed by the motion of the lever 107 when the plate ($a$) passes under the rollers or wheels 114. As the wheels 114 are lifted by the movement of the plate under them they cause the lever 107 to swing out of engagement with the lever 97 and the spring 101 then throws the lever 97 and the pawl 96 toward the ratchet wheel 95, engaging the pawl with the ratchet. At this time the lever 99 is moving upward and the roll 90 is rotated to feed the solder foil. If it should happen that no plate is in position to receive its solder the wheels 114 will retain their lower positions in the cavities 115 and the spring 115 will then act to throw the lever 107 against the lever 97 and move the same to disengage the pawl 96 from the ratchet 95. When this takes place the upward motion of the arm 99 will be idle and no solder will be fed. In this way waste of solder is prevented.

To the end of the rocker 81 opposite the end to which the rod 104 is connected is joined a rod 117, this rod having an extension 118 pivoted thereto and such extension being articulated at its upper end to a lever 119 fastened to a shaft 120 mounted to rock in the framing of the solder applying device. The shaft 120 carries two arms 121 and these are pivotally joined to forks 122 attached to a knife plate 123. The knife plate 123 is vertically guided in the frame of the solder applying device and has a spring pressed edge 124 adapted to stroke past a stationary edge 125 and sever a narrow strip of solder which is represented at $b'$ in Fig. 11. The continued downward motion of the knife carries this strip of solder against the face of the blank $a$ and the spring pressed edge of the knife yieldingly but firmly presses the solder against the blank causing it to adhere. After this the knife blade 123 returns to its raised position.

123$^a$ indicates a stationary stop plate located just outward from the knife 123 to strip the main body of the solder from the blade and prevent the blade lifting this solder with it. The plate is then moved ahead and a second plate advanced to the solder applying position whereupon the arm again moves upward repeating the operation. It will be observed that the motion of the arms 99 and 119 is not simultaneous owing to the connection of said arms to the opposite ends of the rocker 81, the arm 99 moving upward to advance the foil while the blade 123 is inactive; and then on the downward movement of the arm 99 the arm 119 moves upward to force the blade 123 down and sever and impress the strip of solder on the blank.

I have so far described the magazine in which the blank plates are stored, the device for progressively feeding the blanks and the means for applying the solder to one edge of each plate. It is next necessary in the formation of a lap seam can body to slightly crimp the edges of the tin so that they will be curved and will lie tightly together when the blank is bent facilitating the formation of a secure seam and avoiding the defect which would otherwise follow; to wit, the edges of the rolled blank standing at an angle to each other and at tangents to the horn around which the blank is rolled to form the can body. The devices for so crimping or shaping the edges of the blank will now be described, reference being had especially to Figs. 1, 2, 13 and 14.

In the before described bridge 34 are arranged two opposed holders 126. These are adjustably held each of them by a number, preferably three, stud bolts 127 adjustable in the bridge 34 and they carry each of them a stationary die 128 and a movable die 129 the lower edge of the stationary die being arranged in the plane of the line of travel of the blank tin. These parts 128 and 129 are shaped or curved at their meeting surfaces so that when the tin is introduced between them and the dies pressed together it will be shaped at its edges in accordance with the form of the dies. The movable dies 129 are mounted on slides 130 which operate in slideways 131 on the carriers 126 and are each of them joined to links 132 extending downward through the table 33 and connected to slides 133 mounted in boxes 134 suitably attached to the framing 32 of the machine (for instance see Fig. 14). These slides 133 are actuated by cams 135 on a shaft 136 mounted in the frame 32 and each slide has a spring 137 attached through the medium of arms 138 secured to the slides, which springs hold the anti-friction rollers at the lower ends of the slides in contact with the cams 135. Said shaft 136 is driven from the shaft 53 by a spur gear 139 attached to said shaft and meshed with a gear 140$^x$ secured on the shaft 53 (see dotted lines in Fig. 1). The parts are so timed that as a can blank is advanced from the solder applying station to a position within the bridge 34 the cams 135 raise the movable dies 129 and clamp the edges of the blank between the two pairs of dies suitably crimping or forming the edges and immediately thereafter the movable dies 129 drop by the action of the springs 137, allowing the blank plate to be advanced for the next operation.

The operation immediately following that of crimping the edges of the blank as above described consists in the act of bending the previously flat plate around a horn into cylindrical or other form and lapping the edges to form the seam. The devices for so acting on the blank are illustrated in Figs. 1, 2, 15, 16 and 17. The shaft 53 carries two cams 140 which work between opposing rollers 141 on slides 142. These slides have downward extensions 143 guided in boxes 144 attached to the frame 32 and upward extensions 145 guided in boxes 146 forming part of a minor frame 147 attached to the rear side of the main frame 32 just rearward of the position of the bridge 34. The slides 142 actuate cross heads 148 to the outer ends of which rods 149 are pivoted. These rods extend upward at each side of the machine and are articulated to folding wings 150 also pivoted to the minor frame 147 at the point 151 (see Fig. 16). These folding wings 150 as here shown are of the form of an arc of a circle (adapted to the formation of a circular can body) and coact with a cylindrical horn 152 fastened on a stud shaft 153 which shaft is secured in an inverted bracket 154 bolted to the underside of the bridge 34 (see Figs. 18 and 19). One of the cross heads 148 carries, by means of a bracket 148ª, a cam plate 155 which has a plain side running against a backing roll 156 mounted in the secondary frame 147 while the face of the cam plate has an incline 155ª and a second incline 155ᵇ. Said face of the cam plate operates against a roller 157 carried on an elbow lever 158 which is fulcrumed on the secondary frame 147 at the point 159 (see Fig. 17). The elbow lever 158 carries a roller 160 which engages a wear plate on the underside of a cross arm 161 contained within said secondary frame 147 and said cross arm has two pins 162 sliding freely through the upper part of said frame 147.

163 indicates springs which serve to press down the cross arm 161 and pins 162. The upper ends of said pins are fastened to a clamp block 164 located directly under the horn 152. When a can blank is advanced by the action of the left hand dogs 71 in Fig. 4 from the edge crimping device shown in Figs. 13 and 14 to a position under the horn 152, the folding wings 150 are thrown down to a point below the horn and the clamping block 164 is also down at which time the cams 140 are disengaged from the uppermost rollers 141 and the surface 155ª of the cam plate 155 lies below the roller 157 of the elbow lever 158. The operation of the parts is so timed that when the can blank is fully introduced beneath the horn 152 and above the clamp block 164 the cams 140 rotate against the upper rollers 141 and raise the wings 150 to the position shown in Fig. 16. In this connection it will be noted that the cams 140 rotating in the direction of the arrow in Fig. 17, first engage the elevated portions 140ª with the upper rollers 141 and the wings 150 thereby receive their extreme upward motion pressing the can blank very firmly against the horn. Instantly thereafter the extreme elevations 140ª of the cams 140 disengage the upper rollers 141 while the cams continue to rotate their main elevation 140ᵇ against these rollers holding the can blank around the horn but in comparatively loose engagement therewith. Simultaneously with the upward motion of the cross head 148 due to the above described action of the cams 140 the cam plate 155 runs its surface 155ª against the roller 157 and rocks the elbow lever 158 so as to raise the clamping block 164, this clamping block supplementing the action of the wings 150 in folding the blank and preventing the blank from lying loose at the bottom of the horn which would result in an irregularly shaped can body. The additional upward movement of the cam plate 155 finally runs the surface 155ᵇ past the roller 157 and the cam plate is held in this position until the return of the cross head 148 due to the reversal of the action of the cams 140. The purpose of first tightly clamping the blank around the horn and subsequently relaxing this pressure slightly is to allow the blank after it has been rolled into shape with its edges lapped preparatory to forming the seam, to be moved out of engagement with the horn and onto the turret where the soldering or sweating operation is performed.

I shall now proceed to describe the devices for moving the can body from between the horn and the folding wings onto the turret immediately after the operation of the folding wings above described. For this purpose reference is had particularly to Figs. 2, 18, 19, 20 and 21. As shown in Figs. 2, 18, and 21 the bridge 34 has two arms 165 fastened to its forward side and projecting downward to the level of the cap 69 over which the blank plates move, these arms having forward extensions 166 which project to a point adjacent to the rear wall of the magazine directly over the racks 70 which carry the feed dogs 71. Pivoted to the outer side of each of said extensions 166 are stops 167 pressed down by springs 168. These stops are adapted to have the blank plate run under them, the stops yielding upward to permit the rearward movement of the dogs but prevent the return movement of the plates since the springs 168 instantly push the stops down, back of the blank plates as such plates pass the stops. The forwardmost stops (right hand stops in Fig. 18) serve to hold the plates from retrograde movement while said plates are engaged with the solder applying device and the rearwardmost stops (left hand stops in Fig. 18) serve to hold the plates from retrograde movement during the action of the edge crimping devices. When the plates pass from the edge crimping devices into engagement with the horn they are, instantly thereafter, engaged by the folding wings 150 and clamping block 164 and are held by these devices until the fold is completed and then the wings 150 relax their pressure in the manner and for the purpose hereinbefore explained. It is at this time that the devices for pushing the can body off the horn come into action. These devices are actuated by a toothed sector 169 attached to a shaft 170 mounted in bearings 171 on the bridge 34. This shaft is given a regular rocking motion by an arm 172 to which is articulated a link 173 extending downward to a crank 174 on the shaft 53. The toothed sector 169 meshes with a rack 175 which reciprocates longitudinally of the machine in a seat 176 formed in the top of the bridge 34. This rack has attached to its front end a downwardly extending bracket 177 to which five longitudinally disposed fingers 178 are adjustably fastened. These fingers are disposed in circular arrangement and are designed to pass through five grooves 179 formed in the horn 152 as shown best in Fig. 16. For the purpose of better accommodating the fingers the wings 150 are provided with corresponding grooves 180 on their interior surfaces, also illustrated best in Fig. 16. At the time that the wings 150 move upward to fold the plate the fingers 178 are withdrawn forwardly out of the path of the wings and the instant that the raised portions 140$^b$ of the cams 140 clear the upper rollers 141 and the pressure of the wings 150 is relaxed, the sector 169 reverses its motion and moves the fingers 178 rearward, said fingers being thereupon entered into the grooves 179 and 180, striking the forward edge of the can body and sliding the same rearward off of the horn 152 and into engagement with the turret, which is at this time in position to receive the can body for the further operations to be performed thereon as will now be described.

The foregoing description will, it will be recalled, make clear the feeding of the blank from the magazine, the application of the solder foil to the edge of the blank, the crimping of the edges of the blank, the folding of the blank to form the can body and the movement of the can body, yet to be soldered, from the horn and folding wings into engagement with the turret. On the turret the seam of the can is subjected to a flame which melts the solder and causes it to flow, hermetically sealing the seam and then to cooling devices which cool the solder and cause it to set after which the can is ejected from the turret and automatically moved into engagement with the edge forming devices which perform the final operation as far as this machine is concerned. The turret is mounted on the column 31 above described which has an annular track 181 mounting the turret annulus. The turret annulus as shown best in Fig. 24, is composed of two parts 182 and 183 shaped to afford an annular opening 184 at the bottom and an open raceway 185 within the annulus, such raceway having ratchet teeth 186 on its outer wall (see Fig. 22). The turret annulus is given an intermittent or step by step rotary motion by means of a slide 187 which carries a pawl 188 pressed by a spring 189 against the ratchet teeth, these parts lying in the chamber 185 which is provided for their accommodation. Projecting down from the slide 187 through the opening 184 is a stud 190 to which is articulated a link 191 in turn articulated to a lever 192. This lever (see Fig. 1) is fulcrumed on the column 31 at 193 and has a slotted lower end 194 with which is adjustably connected a link 195, this link is actuated by an eccentric 196 on the shaft 53. As shown best in Fig. 22, the upper section 183 of the annulus is formed with radial grooves 197 and within these grooves are arranged keys 198 having corresponding engagement with grooves 199 (see Fig. 23), in the base of the can body holders. The can body holders are mounted on top of the turret annulus and there is one for each of the grooves 197. They are spaced equidistant around the annulus and each of the holders comprises a rigid outer or main part 200 within which is a core comprising a yielding segment 201 and a web or rib 202. The cores of the turret holders are unattached to the main parts 200 so that the can bodies may be moved freely in one end and off the other of the holder and the turret is adapted to stop its motion with a holder opposite the horn 152. To secure the core from such movement during the time that the can body is being moved the core is provided with a hook 203 (see Figs. 22 and 24). This hook is adapted to engage with a corresponding hook 204 fastened to the shaft of the horn 152. When the turret thus stops and engages the hook 203 of one of the body holders with the hook 204 of the horn the can body is moved off the horn onto the body 200 of the holder and around the segment 201, the hooks 203 and 204 preventing the core from moving. Simultaneously the finished can body is pressed by the oncoming can body out of the holder to another part of the machine as will hereinafter fully appear. This motion of the can body from the horn 152 onto the can body holder is brought about by the action of the rods 178 and appurtenant parts above described. The diameter of the holder is equal to the diameter of the finished can body, and since the bent blank, before it is inserted into the holder, is slightly larger in diameter than the finished can, the diameter of the blank is reduced as it is moved into the holder.

The main part 200 of the can body holder is open at the top as shown in Fig. 23 to expose the seam of the can body; and for the purpose of pressing the parts of the seam together during the heating or solder melting operation I provide a dog plate 205 adapted to bear on top of the seam and coacting with a supporting rib 206 sustained by the web 200 of the core of the body holder. This dog plate 205, as shown best in Fig. 22, is preferably formed with a serrated edge engaging the seam and it is mounted on a rock shaft 207 carried by the body of the holder which rock shaft has attached thereto an arm 208. Said arm carries at its free end a roller 209 and this roller runs against the cam track 210. The cam track 210 is mounted on an annulus 211 which in turn is fastened to a stand 212 mounted on and secured to the pedestal 31 inside of the track 181. The stand 212 is open at the sides as indicated at 214 to permit the discharge of the finished can body as will hereinafter appear. Said cam track 210, as shown best in Fig. 23, has a gap 215 therein directly opposite the horn 152 and below this gap a second cam 216 is arranged. This construction causes the arm 208 to be thrust up as soon as the body holder reaches its position opposite the horn, thus allowing the finished can body to be ejected and the oncoming can body to take its position in the holder without obstruction. As soon, however, as the turret resumes its motion the roller 209 runs off of the cam 216 and reëngages the cam track 210 with the result that the clamp plate 205 is pressed down on the seam as indicated by dotted lines in Fig. 23 which position it retains until the turret makes a complete rotation and returns the finished can body to the ejecting position.

On the annulus 211 is mounted a box 217, the same being formed with a partition 218 dividing it into two compartments with which gas connection 219 and air connection 220 respectively communicate. This box 217 is formed with a slot 221 in the wall of the gas compartment and a slot 222 in the wall of the air compartment and with these slots nipples 223 on a ring 224 are adapted successively to register. The ring is rotatably mounted around the box on the annulus 211 and as it rotates the nipples 223 successively communicate with the gas and air compartments. Each nipple 223 carries a pipe 225 terminating in a sleeve 226 in which sleeves pipes 227 are adjustable, the pipes having openings 228 by which they communicate with the pipes 225. The pipes 227 are provided at their lower ends with sleeves 229 carrying burner pipes 230 which are also adjustable longitudinally and are provided with elongated openings 231 which admit of such adjustment without disturbing the communication between the two pipes. 233 indicates a bracket fastened to the turret annulus and rising from the same to connect with one of the tubes 225. In this way the ring 224 and its attachments are rotated. Of these burner pipes 230 there is one for each can body holder and they are arranged directly over the same so that when the nipples 223 communicate with the gas compartment of the box 217 the flame from the burner pipes will play on the seams melting the solder therein and finishing the seaming operation. As the rotation of the ring 224 continues the gas is cut off and air, under pressure from the air compartment of the box 217, flowing through the opening 222 plays on the seam to cool and fix the solder.

234 (see Fig. 22) indicates a constantly burning pilot light which serves to ignite the gas each time that one of the nipples 223 registers with the gas feed orifice 221. This pilot light I prefer to mount on the bridge 34. It is not shown in Fig. 1 to avoid confusion of the drawing. It may be mounted in any other suitable or convenient way. The can bodies, therefore, are moved from the folding wings and horn onto the body holders of the turret and the turret rotating with the can bodies first causes a flame to play on the seam melting the solder, after which air is blown over the solder to cool it and the finished can body is finally returned to the starting position opposite the horn 152. At this time a new can body is moved from the horn onto the body holder, the oncoming can body engaging the finished can body and moving the same off of the inner end of the body holder through one of the openings 214 in the stand 212 and allowing the finished can body to drop through a chute 231 in the hollow column as shown best in Fig. 2. This chute 231 has its lower end curved laterally and passes out through the side of the column at the rear end of the machine to carry the finished can bodies from the machines.

The organized operation of the machine may be traced as follows: A pile of blanks of the requisite shape and dimension is placed in the magazine and the parts having been adjusted as described upon rotation of the prime mover shaft 53 the racks 70 are caused to move back and forth in such a manner that the dogs 71 successively advance the plates to the solder applying, edge forming and bending stations of the machine, the blanks stopping momentarily at each station and being retained in such stations by the action of the spring pressed dogs 167 shown best in Fig. 18. At the solder applying station a strip of foil is severed and impressed upon the edge of the blank adhering thereto by reason of the sticky flux described. At the edge forming station the edges of the blank are crimped so as to cause them to lie snugly at the seam; and at the bending station the previously flat blank is rolled up around the horn in circular or other form as may be desired. The intermittent action of the turret causes it to stop each time with one of the body holders opposite the horn 152 and at this time the rods 178 move rearward engaging the body on the horn and sliding the same off into the holder on the turret. The turret then resumes its motion and the clamp plate 205 engages the seam. As the rotation of the turret continues, a flame is first played on the seam to melt the solder and then a blast of air is blown to cool and set the solder so that when the turret makes a complete revolution the finished can body is again opposite the horn 152 in the body holder. At this time a second can body is moved from the horn onto the holder and the oncoming can body strikes the finished can body and discharges the same into the chute 231. The finished can body passes down this chute to the edge flanging device and is discharged from the same after the edge flanging operation.

Having thus described my invention, what I claim as new and desire to secure by Letters Patent of the United States is:

1. In a can body former, the combination of devices for applying solder to the edge portion of a blank plate, means for bending the blank plate into the form of a can body with solder in the seam, a step-by-step moving means for receiving the body from said devices, means for moving the body to said step-by-step moving means, means for heating the solder while the body is held by the step-by-step moving means and a driving means common to all of said means and devices.

2. In a can body former, the combination of a magazine for the blank plate, a solder applying device juxtaposed thereto, means for bending the edges of the blank juxtaposed to the solder applying device, means for bending the blank into the form of the can body juxtaposed to the edge bending devices, feeding means adapted to advance the blanks with a step-by-step motion successively to said elements, a step-by-step moving means adapted to receive the can body from the said bending means, devices for transferring the can body to said step-by-step moving means devices for heating the can when the same is held by the step-by-step moving means and a driving means common to all of said means and devices.

3. In a can body former, the combination of devices for applying solder to a blank plate, means for bending the blank plate into the form of a can body with solder in the seam, a step-by-step moving turret, holders on the turret to receive the can bodies, means for moving the can bodies to the holders, means for heating the can bodies on the holders to melt the solder and a driving means common to all of said means and devices.

4. In a can body former, the combination of a means for bending the blank plate into the form of a can body, a step-by-step moving holder for the can body comprising an outer part and a loose core, means for moving the can body into the holder and means for locking the core against removal as the can body is so moved.

5. In a can body former, the combination of a horn, means for bending the blank plate around the horn to form a can body, a body holder, a plurality of bars arranged to move past the horn to push the can body from the same to the holder, means for periodically moving the bars, said holder comprising an outer part with a loose core and a lock for holding the core while the can body is moving into engagement therewith.

6. A can body former having a holder for the can bodies comprising a stationary outer part and a core, a locking member, means for moving the holder to bring the core in and out of engagement with said member, said locking member holding the core from endwise motion when in operation and means for forcing the can body into the holder during the time that the lock is in operation whereby the oncoming can body dislodges the can body previously formed.

7. In a machine of the class described, the combination of a reciprocating slide, a cover therefor constituting a support for a column of blanks, side walls constituting with said cover a magazine, means for adjusting said walls in respect to each other, slides arranged above and on opposite sides of said reciprocating slide and adjustable laterally with respect thereto and dogs upon said slides adapted to engage the lowermost blank on the forward movement of the slides.

8. A machine of the class described, having a magazine including oppositely disposed side walls provided with horizontal flanges forming part of the bottom of said magazine, an end wall beneath which the blanks in said magazine move in succession, a plate spaced apart from said flanges and lying in the plane thereof forming a central support for the blanks, a slide arranged below said plate, oppositely disposed dogs on said slide extending through grooves between the plate and the flanges and adapted to engage the lowermost blank, means for adjusting said side walls with respect to each other, and means for adjusting said dogs toward or from their respective side walls.

9. A machine of the class described, having means for bending a blank plate to form a can body, a frame part vertically adjustable in respect thereto, a rack slidable upon said frame part, means for operating the rack and a plurality of fingers on the rack to engage the blank plate and advance the same through the machine.

10. A machine of the class described having a frame, a magazine supported thereon formed of side sections and a bottom section, means for adjusting said side sections vertically, a plurality of vertically arranged screw threaded bolts supporting said bottom section, means for moving all of said bolts simultaneously to vary the position of said bottom section, a former, and means for feeding blank plates from said magazine to said former.

11. A machine of the class described, having a reciprocating member operating to feed blank plates, means for vertically adjusting said member, a pivoted lever for reciprocating said member and slot connections between said lever and said slide whereby the operative relationship of the lever and member is unaffected by the vertical adjustment of said member.

12. A machine of the class described, having a magazine for flat blank plates, means for applying a strip of solder to one edge of each plate and means for applying an adhesive flux to the solder prior to the application of the solder to the plate.

13. A machine of the class described, having a magazine for flat blank plates, means for applying a strip of solder to one edge of each plate, means for applying adhesive flux to the solder prior to the application of the solder to the plate and means for vertically adjusting said magazine in respect to said solder applying means.

14. A machine of the class described, a frame, a member for moving blank plates along said frame, a solder applying device adjacent one side of the frame and supported independently thereof and means for applying an adhesive to the solder prior to the application of the latter to the plates.

15. A machine of the class described, having means for supporting blank plates, means for moving said blank plates along said supporting means, means for delivering a band of solder foil, means for applying an adhesive to said band and means for severing a portion of said band and applying said portion to the edge of each blank, while the latter rests upon said support.

16. A can body former having means for feeding a web of solder foil, a blade adapted to sever a strip therefrom and impress the same upon the can blank, means for thereafter bending the blank to form the can body with a lap seam, and with the said strip of solder in the seam and means for heating the seam to cause the solder to flow, and means for applying an adhesive flux to the solder foil before the application thereof to the blank.

17. In a can body former, the combination of a solder-applying means, means for applying an adhesive flux to the solder previous to its application to the blanks, an edge-forming means, a body-forming means, a heating and soldering means, means for feeding the blanks successively to said means, a horn over which said blanks are successively moved, and means for supporting the blanks about said horn during their passage thereover.

18. In a can body former, the combination of a means for applying solder to blanks previous to their formation into can bodies, means for applying an adhesive flux to solder previous to its application to the blanks, longitudinal edge-shaping devices arranged to act upon the blanks previous to their formation into can bodies, a body-forming means, a heating and soldering means, and means for feeding the blanks to said several stations.

19. In a can body former, the combination of a solder-applying means, means for applying an adhesive flux to the solder previous to its application to the blanks, longitudinal edge-shaping devices arranged to act upon the blanks previous to their formation into can bodies, a body-forming means, a heating means for the previously applied solder, means for feeding the blanks to said several means.

20. A machine for forming lap seam can bodies having oppositely disposed pairs of coacting dies for bending the side edges of the blank, means for adjusting said dies vertically and means for feeding the blank to bring its opposite edges into engagement with the dies.

21. A machine for forming lap seam can bodies having oppositely disposed pairs of coacting dies for bending the side edges of the blank, means for adjusting said dies vertically and laterally and means for feeding the blank to bring its opposite edges into engagement with the dies.

22. A machine for forming lap seam can bodies, having normally stationary oppositely disposed dies, each presenting a curved edge, oppositely disposed slides, each carrying a die for coacting with its corresponding one of said first-mentioned dies, means for adjusting the pairs of dies vertically and laterally, means for feeding a blank to bring its opposite edges between the opposite pairs of dies, the curvature of the coacting faces of said dies being substantially the same as that of the can body to be formed, means for directly thereafter bending the body portion of said blank to overlap said curved edges, and means for soldering together said overlapped edges.

23. A machine for forming lap seam can bodies, having oppositely disposed pairs of coacting dies for bending the side edges of the blank to a curvature substantially equal to the curvature of the can body to be formed, a can body former for bending the body portion of the blank to overlap said curved edges, means for soldering together said overlapped edges, and means for vertically adjusting said pairs of co-acting dies.

24. A machine for forming lap seam can bodies, having oppositely disposed pairs of coacting dies for bending the side edges of the blank to a curvature substantially equal to the curvature of the can body to be formed, a can body former for bending the body portion of the blank to overlap said curved edges, means for soldering together said overlapped edges, and means for laterally adjusting one pair of dies in respect to the other.

25. A machine for forming lap seam can bodies, having means for applying solder to the edge portion of a blank plate, means for bending opposite side edges of said blank plate to a curvature substantially equal to the curvature of the can body to be formed, means for vertically adjusting said bending means, means for bending the body of the plate to overlap said curved edges, means for heating said solder to secure said edges together and step by step feeding mechanism for delivering the blank to said means successively directly in the order named.

26. A can body forming machine, having means for bending the can blank to substantially cylindrical form with the edges overlapping, the diameter being greater than the diameter of the completed can body, a receiver having an interior diameter substantially equal to the can body to be formed, and means for delivering the blank from said bending means to said receiver.

27. A can body forming machine, having means for bending the can blank to substantially cylindrical form with the edges overlapping, the diameter being greater than the diameter of the completed can body, a receiver having an interior diameter substantially equal to the can body to be formed, means for delivering the blank from said bending means to said receiver, and means for securing together the side edges of said blank while said blank is within said receiver.

28. A can body forming machine, having means for bending the can blank to substantially cylindrical form with the edges overlapping, the diameter being greater than the diameter of the completed can body, a receiver having an interior diameter substantially equal to the can body to be formed, means for delivering the blank from said bending means to said receiver and means for soldering together the side edges of said blank while said blank is within said receiver.

29. A machine for forming can bodies, having a horn, means for bending a can blank around said horn to overlap the edges, a receiver having an interior diameter substantially equal to the exterior diameter of the can being formed and a bar movable lengthwise of said horn and engaging with the can blank at the overlapping edges for transferring the latter from said horn and to said receiver.

30. A can body former, comprising means for bending a can blank to overlap the opposite edges and produce a body of greater diameter than the desired can-body, a receiver of the diameter of the desired can body, and means for moving the blank axially from said bending means into said receiver.

31. A can body former, having a horn, means for bending a can blank around said horn to overlap the side edges of the blank, a receiver, means for moving said can blank longitudinally from said horn into said receiver, a core within the receiver for interiorly supporting the can body at the overlapped edges and means for soldering together said overlapped edges, said core being unattached to the receiver during the soldering operation.

32. A can body forming machine, having means for bending a can blank to substantially the desired form, a receiver, means for moving said body into said receiver, a core for supporting the body at overlapped edges and means for preventing axial movement of the core during the insertion of the body within said receiver, said core being in engagement solely with the can body save during the operation of said last-mentioned means.

33. A can body forming machine, having a receiver, a removable core loosely fitted in said receiver, means for transferring a can blank with overlapped edges to the space between said receiver and said core, means for automatically engaging the core and preventing longitudinal movement of the core during the insertion of the blanks, means for moving the core and receiver laterally away from the transferring means after the insertion of the blank, and means associated with said receiver for soldering together the side edges of the blank.

34. A can body forming machine, having a receiver, a removable core loosely fitted in said receiver, means for transferring a can blank with overlapped edges to the space between said receiver and said core, means for automatically engaging the core and preventing longitudinal movement of the core during the insertion of the blank, means for moving the core and receiver laterally away from the transferring means after the insertion of the blank, and means movable laterally with the receiver for soldering together the side overlapped edges and for cooling the soldered seam.

35. A can body forming machine, having a receiver adapted to support a can body blank with the edges of the latter overlapped, a core within said receiver for interiorly supporting the blank at overlapped edges, a movable member having a serrated edge for engaging with the outer surface of the can body at the overlapped edges and means for heating said overlapped edges.

36. A can body forming machine, having means for bending a can blank to bring the opposite edges adjacent each other, a rotatable turret, having a plurality of receivers about the periphery thereof and into which can blanks are fed in succession from said bending means and means for securing together the edges of the body while within said receiver, each receiver being open at both ends whereby each can body is ejected from the receiver into the center of the turret by the insertion of a second can body to the same receiver.

37. A can body forming machine, having means for bending a can blank to bring the opposite edges adjacent each other, a rotatable turret, having a plurality of receivers about the periphery thereof, each receiver being open at both ends, means for feeding can blanks in succession from said bending means into one end of each to eject a previously inserted can from the opposite end and means for securing together the edges of the body while within said receiver.

38. A can body forming machine having means for bending the can blank to bring opposite edges adjacent each other, a rotatable turret, having a plurality of receivers arranged about the periphery thereof and each open at both ends and movable in succession past said bending means, a core within each receiver and means for feeding blanks from said bending means onto said core, each blank being forced off its core upon the insertion of a second blank within the receiver.

39. A can body forming machine, having means for bending the can blank to bring opposite edges adjacent each other, a rotatable turret having a plurality of receivers arranged about the periphery thereof and movable in succession past said bending means, a core within each receiver, means for feeding blanks from said bending means onto said core, to simultaneously force off its core a previously inserted blank, and means for preventing longitudinal movement of the core during said movement of the can body.

40. A can body forming machine, having means for bending the can blank to bring opposite edges adjacent each other, a rotatable turret having a plurality of receivers arranged about the periphery thereof and movable in succession past said bending means, a core within each receiver, means for feeding blanks from said bending means onto said core, each can body being forced off its core upon the insertion of a second blank within the receiver, and means detachably engaging with the core for preventing longitudinal movement thereof during the insertion of the can body.

41. A machine for forming lap seamed sheet metal bodies, having means for first applying solder to the can blank, means for moving the blank to a bending means, means for then bending the blank into the desired form with the edges overlapping, a holding means, means for moving the bent blank into the holding means, means for applying heat to the overlapped edges to melt the solder, means for applying pressure to the overlapped edges to press them tightly together during the application of heat, means for cooling the overlapped portions prior to relieving the pressure and means for removing the can body from the holding means.

42. In a can body forming machine, a receiver, a core within said receiver, said receiver and core providing a space therebetween open at both ends, means for introducing the can body into said space through one end thereof, means for soldering the can body while in said receiver, the succeeding can body when introduced in the receiver being adapted to engage the aforesaid can body and push it out of the receiver through the other end of said space after the aforesaid body is soldered.

43. In a can body forming machine, a horn, means for bending the can body into cylindrical form on said horn, means for releasing said bending means after the body is bent so as to enable said can body to expand slightly to a diameter slightly larger than the final diameter of the can, a receiver, means for pushing the body off the horn while the body is expanded onto said receiver, said receiver being adapted to reduce the body to its final diameter, means for soldering the can while in the receiver, said pushing means being adapted to push the can body, after it is soldered, from the receiver, upon pushing the succeeding can body onto said receiver and against the aforesaid can body.

44. In a can body forming machine, a horn, means for bending the can body into cylindrical form on said horn, means for releasing said bending means after the body is bent, so as to enable said can body to expand slightly to a diameter slightly larger than the final diameter of the can, a receiver, means for transferring the body while expanded from the horn to the receiver, said receiver being adapted to reduce the body to its final diameter and means for soldering the can while in the receiver.

In testimony whereof I have signed my name to this specification in the presence of two subscribing witnesses.

LEE C. SHARP.

Witnesses:
H. N. DOVEY,
J. G. RICHEY.